US012387708B2

(12) United States Patent
Tu et al.

(10) Patent No.: US 12,387,708 B2
(45) Date of Patent: Aug. 12, 2025

(54) ELECTRONIC SYSTEM HAVING HEAT DISSIPATION AND FEED-FORWARD ACTIVE NOISE CONTROL FUNCTION

(71) Applicant: ACER INCORPORATED, New Taipei (TW)

(72) Inventors: Po-Jen Tu, New Taipei (TW); Jia-Ren Chang, New Taipei (TW); Kai-Meng Tzeng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 434 days.

(21) Appl. No.: 18/085,536

(22) Filed: Dec. 20, 2022

(65) Prior Publication Data

US 2024/0071361 A1 Feb. 29, 2024

(30) Foreign Application Priority Data

Aug. 31, 2022 (TW) ................................. 111132945

(51) Int. Cl.
*G10K 11/00* (2006.01)
*G10K 11/178* (2006.01)

(52) U.S. Cl.
CPC .. *G10K 11/17883* (2018.01); *G10K 11/17854* (2018.01); *G10K 11/17881* (2018.01)

(58) Field of Classification Search
CPC ....... G10K 11/17883; G10K 11/17854; G10K 11/17881; G10K 11/17813; G10K 2210/11; G10K 2210/3025; G10K 2210/1082; G10K 2210/111; G10K 2210/512
See application file for complete search history.

(56) References Cited

U.S. PATENT DOCUMENTS

| | | | | |
|---|---|---|---|---|
| 2007/0110255 | A1 | 5/2007 | Barath | |
| 2010/0028134 | A1 | 2/2010 | Slapak | |
| 2013/0136274 | A1 * | 5/2013 | Ahgren | G10L 21/02 381/92 |

(Continued)

FOREIGN PATENT DOCUMENTS

| | | | |
|---|---|---|---|
| CN | 114746934 | A | 7/2022 |
| TW | 201731301 | A | 9/2017 |

*Primary Examiner* — Vivian C Chin
*Assistant Examiner* — Annabelle Kang
(74) *Attorney, Agent, or Firm* — Winston Hsu

(57) ABSTRACT

An electronic system includes a fan module, an embedded controller, a reference microphone, a stereo speaker module, a beam-forming control module and an ANC controller. The beam-forming control module controls the orientation of the stereo speaker module, which provides a noise cancellation signal according to a speaker control signal. The reference microphone outputs a wide-band noise signal associated with the operation of the fan module. A virtual microphone module in the active noise cancellation controller outputs a virtual error signal according to a first transfer function between the reference microphone and a physical error microphone at a predetermined fan speed, a second transfer function between the stereo speaker module and the physical error microphone when the fan module is not in operation and the wide-band noise signal. The ANC controller provides the speaker control signal according to a synchronization signal, the wide-band noise signal and the virtual error signal.

20 Claims, 6 Drawing Sheets

(56) References Cited

U.S. PATENT DOCUMENTS

| | | | | |
|---|---|---|---|---|
| 2015/0104026 | A1* | 4/2015 | Kappus | G10K 11/175<br>381/63 |
| 2022/0180072 | A1* | 6/2022 | Scalisi | H04B 11/00 |

* cited by examiner

ELECTRONIC SYSTEM HAVING HEAT DISSIPATION AND FEED-FORWARD ACTIVE NOISE CONTROL FUNCTION

BACKGROUND OF THE INVENTION

1. Field of the Invention

The present invention is related to an electronic system having heat dissipation and feed-forward active noise control function and a related method, and more particularly, to an electronic system having heat dissipation and feed-forward active wide-band noise control function based on virtual error signal and beam-forming technique and a related method.

2. Description of the Prior Art

Computer systems have been widely used in modern society. Computer components depend on the passage of electric current to process information. The current flow through the resistive elements of the computer components is accompanied by heat dissipation. The essence of thermal design is the safe removal of this internally generated heat which may jeopardize the components safety and reliability. An electronic system normally adopts a fan capable of accelerating the exchange of air for heat dissipation purpose.

The rotational speed and the static pressure of a fan determine the volume of air which the fan delivers per minute or per hour. The noise generated during the operation of the fan is roughly proportional to the fan speed to the power of 5. More efficient heat dissipation can be achieved under a faster fan speed, but with the main drawback of generating more noises. The trend of adopting more powerful central processing units (CPUs) and device miniaturization increase the amount of heat produced per unit area of the components. Therefore, there is a need of addressing the issues of heat dissipation and noise reduction at the same time.

SUMMARY OF THE INVENTION

The present invention provides an electronic system with heat dissipation and feed-forward active noise control function. The electronic system includes a fan module, an embedded controller, a reference microphone, a stereo micro speaker module, a beam-forming control module and an active noise cancellation controller. The fan module is configured to operate according to a fan control signal for providing heat dissipation. The embedded controller is configured to provide the fan control signal. The reference microphone is configured to detect a wide-band noise generated during an operation of the electronic system and provide a corresponding wide-band noise signal. The stereo micro speaker module includes at least a first speaker and a second speaker, and is configured to generate a noise-cancellation signal according to the speaker control signal. The beam-forming control module is configured to provide a beam-forming control signal for controlling an orientation of the stereo micro speaker module so that a sound direction of the first speaker and a sound direction of the second speaker are towards a specific location. The active noise cancellation controller is configured to provide a virtual error signal according to a first transfer function, a second transfer function and the wide-band noise signal; and provide the speaker control signal according to a synchronization signal, the wide-band noise signal and the virtual error signal. the synchronization signal includes information associated with a structure and an operational setting of the fan module. The first transfer function is a transfer function between the reference microphone and a physical error microphone when the stereo micro speaker is not in operation. The second transfer function is a transfer function between the stereo micro speaker module and the physical error microphone when the fan module is not in operation. The noise-cancellation signal includes a plurality of noise-compensation signals for canceling noises generated during the operation of the electronic system.

The present invention also provides a method of providing heat dissipation and feed-forward active noise control function in an electronic system. The method includes operating a fan module in the electronic system according to a fan control signal for providing heat dissipation; providing the fan control signal using an embedded controller in the electronic system; detecting a wide-band noise generated during an operation of the electronic system and providing a corresponding wide-band noise signal using a reference microphone in the electronic system; generating a noise-cancellation signal according to the speaker control signal using at least a first speaker and a second speaker of a stereo micro speaker module in the electronic system; providing a beam-forming control signal for controlling an orientation of the stereo micro speaker module using a beam-forming control module in the electronic system so that a sound direction of the first speaker and a sound direction of the second speaker are towards a specific location; providing a virtual error signal according to a first transfer function, a second transfer function and the wide-band noise signal using an active noise cancellation controller in the electronic system; and providing the speaker control signal according to a synchronization signal, the wide-band noise signal and the virtual error signal using the active noise cancellation controller. The synchronization signal includes information associated with a structure and an operational setting of the fan module. The first transfer function is a transfer function between the reference microphone and a physical error microphone when the stereo speaker is not in operation. The second transfer function is a transfer function between the stereo micro speaker module and the physical error microphone when the fan module is not in operation. The noise-cancellation signal includes a plurality of noise-compensation signals for canceling noises generated during the operation of the electronic system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
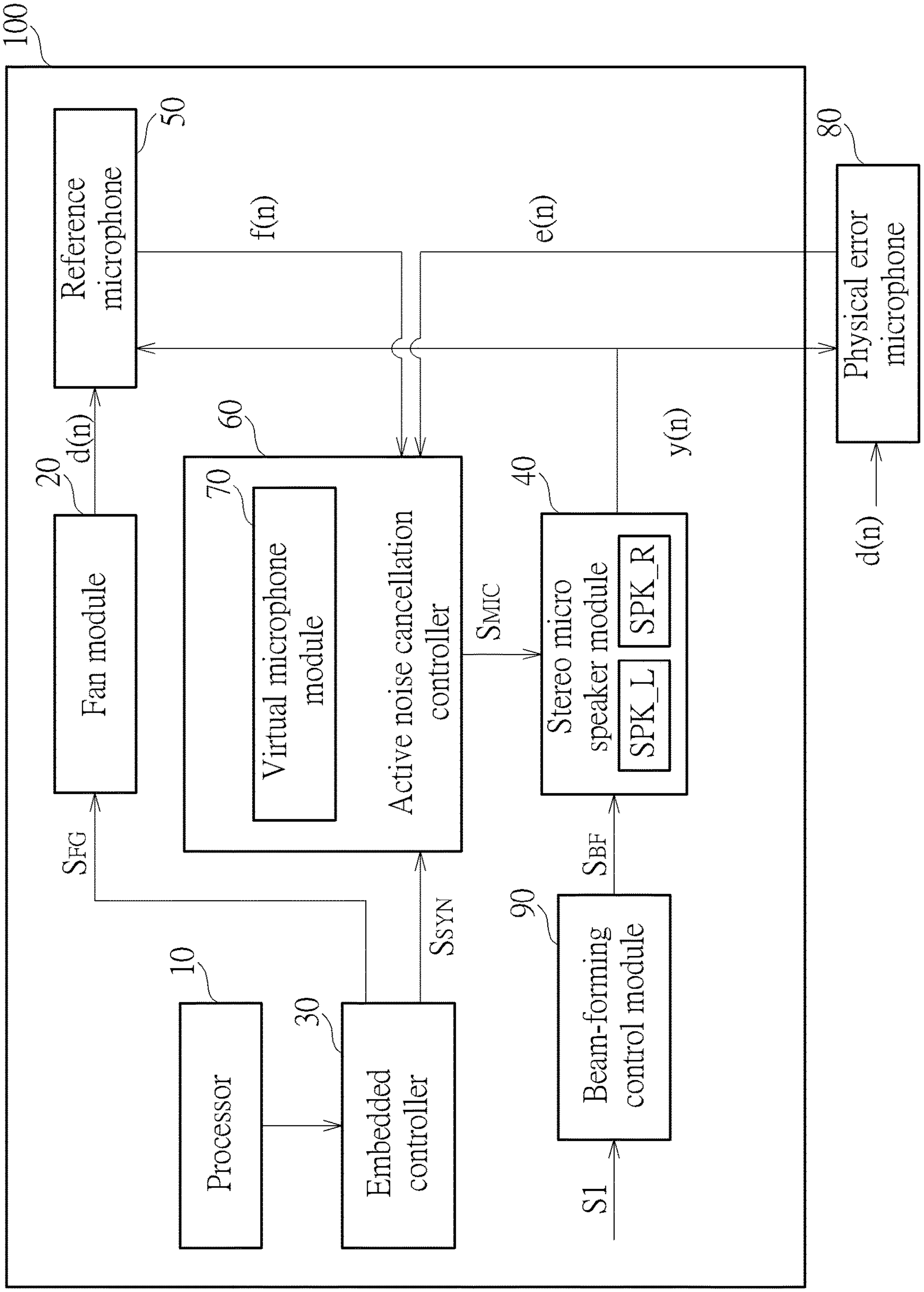
FIG. 1 is a functional diagram illustrating an electronic system having heat dissipation and feed-forward active noise control function when operating in an off-line mode according to an embodiment of the present invention.
Figure 2:
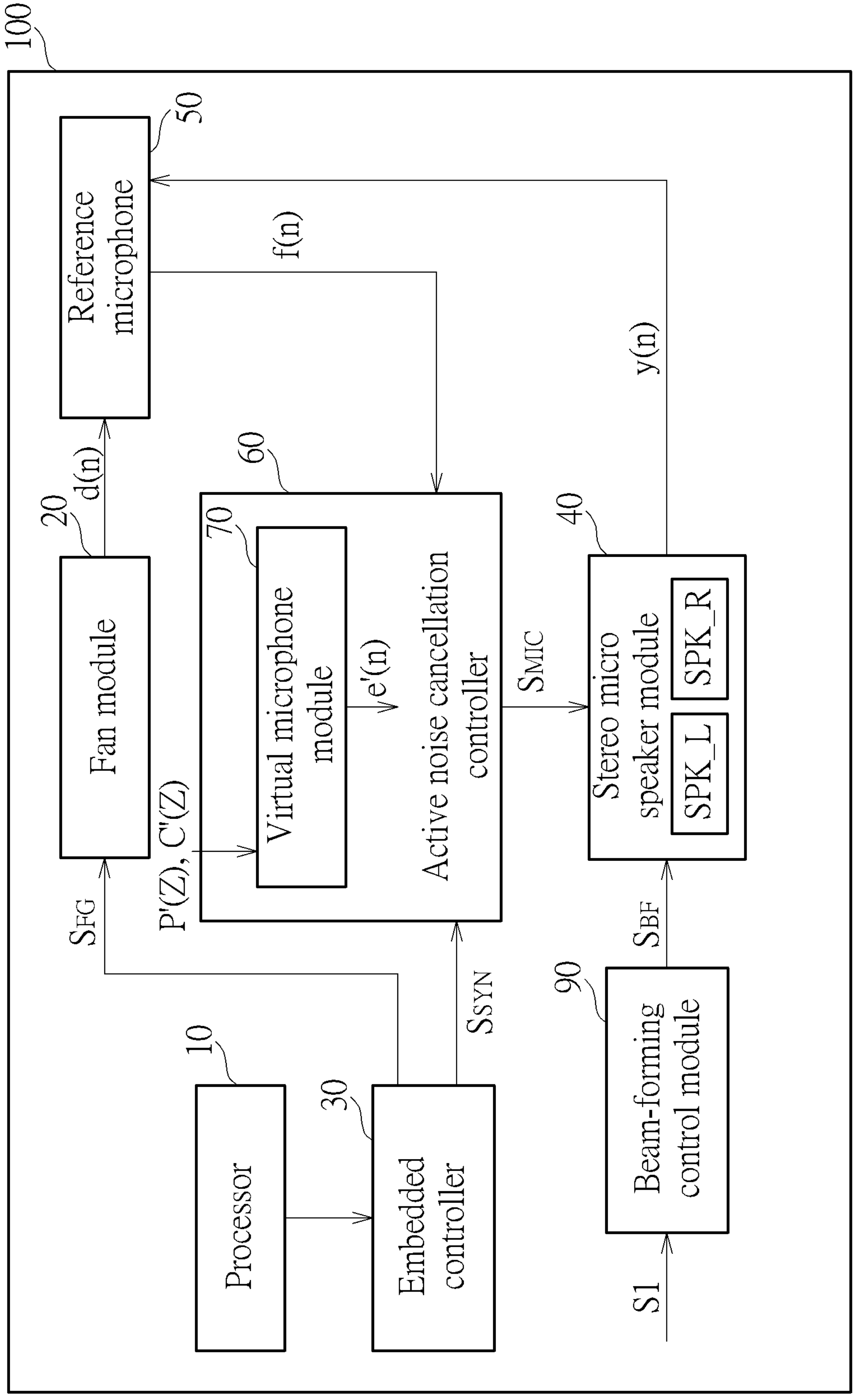
FIG. 2 is a functional diagram illustrating an electronic system having heat dissipation and feed-forward active noise control function when operating in an on-line mode according to an embodiment of the present invention.

FIG. 1 is a functional diagram illustrating an electronic system 100 having heat dissipation and feed-forward active noise control function when operating in an off-line mode according to an embodiment of the present invention. FIG. 2 is a functional diagram illustrating the electronic system 100 having heat dissipation and feed-forward active noise control function when operating in an on-line mode according to an embodiment of the present invention.

The electronic system 100 includes a processor 10, a fan module 20, an embedded controller (EC) 30, a stereo micro speaker module 40, a reference microphone 50, an active noise cancellation (ANC) controller 60 and a beam-forming control module 90, wherein the ANC controller 60 includes a virtual microphone module 70. The stereo micro speaker module 40 includes at least a left-channel speaker SPK_L and a right-channel speaker SPK_R.

In the present invention, the electronic system 100 may operate in the off-line mode and in the on-line mode. As depicted in FIG. 1, when the electronic system 100 operates in the off-line mode, the beam-forming control module 90 is configured to provide a beam-forming control signal $S_{BF}$ according to a location signal S1, and the stereo micro speaker module 40 is configured to adjust the orientation (sound direction) of the left-channel speaker SPK_L and the right-channel speaker SPK_R according to the beam-forming control signal $S_{BF}$. Also, the ANC controller 60 is configured to operate further according to an error signal e(n) provided by a physical error microphone 80 so as to acquire a transfer function D'(Z) between the stereo micro speaker module 40 and the reference microphone 50 at a specific fan speed, a transfer function C'(Z) between the stereo micro speaker module 40 and the physical error microphone 80 and a transfer function P'(Z) between the reference microphone 50 and the physical error microphone 80.

As depicted in FIG. 2, when the electronic system 100 operates in the on-line mode, the beam-forming control module 90 is configured to provide the beam-forming control signal $S_{BF}$ according to a location signal S2, and the stereo micro speaker module 40 is configured to adjust the orientation (sound direction) of the left-channel speaker SPK_L and the right-channel speaker SPK_R according to the beam-forming control signal $S_{BF}$. Also, the virtual microphone module 70 of the ANC controller 60 is configured to acquire a virtual error signal e'(n) based on the transfer function P'(Z) and the transfer function C'(Z), and the ANC controller 60 is configured to provide a speaker control signal $S_{MIC}$ based on the virtual error signal e'(n), a synchronization signal $S_{SYN}$ and a wide-band noise signal f(n) associated with a noise-cancellation signal y(n) for driving the stereo micro speaker module 40. This way, the noise-cancellation signal y(n) generated by the stereo micro speaker module 40 may cancel the virtual error signal e'(n), thereby providing feed-forward active noise control function. The detailed operation of the electronic system 100 in the off-line mode and in the on-line mode will be described in subsequent paragraphs.

The processor 10 may be a central processing unit (CPU) or a graphic processing unit (GPU). As the key engine of executing commands and procedures for running the operating system, the processor 10 is the main source of generating waste heat in the electronic system 100.

The fan module 20 may have different structures depending on its type. Basically speaking, the fan blades are driven by a motor into rotation for drawing cool air into the housing and pushing out warm air for heat dissipation purpose. In the present invention, the fan module 20 is configured to operate according to a fan control signal $S_{FG}$ provided by the embedded controller 30. A larger value of the fan control signal $S_{FG}$ results in a faster rotational speed of the motor in the fan module 20. More efficient heat dissipation can be achieved by increasing the rotational speed of the motor in the fan module 20, but with the main drawback of raising the noise level. During the operation of the electronic system 100, the fan module 20 is the main source of generating noises. In an embodiment, the fan control signal $S_{FG}$ may be a pulse width modulation (PWM) square wave which can be used to adjust the motor speed of the fan module 20 by varying its duty cycle. In an embodiment, the fan module 20 may include one or multiple axial fans or centrifugal fans. However, the number, the type and the driving method of the fans in the fan module 20 do not limit the scope of the present invention.

The embedded controller 30 may store the EC code of each task and timing constraints of the boot process. In the turned-off state of the electronic system 100, the embedded controller 30 continues to operate for awaiting the wake-up message from the user. In the turned-on state of the electronic system 100, the embedded controller 30 is configured to control the standby/hibernate mode, the keyboard controller, the charge indicator and the motor speed of the fan module 20. The embedded controller 30 normally includes a thermal sensor (not shown in FIGS. 1 and 2) for monitoring the operational temperature of the processor 10, thereby outputting the fan control signal $S_{FG}$ accordingly. When the operational temperature of the processor 10 raises, the duty cycle of the fan control signal $S_{FG}$ is increased accordingly for accelerating the motor speed of the fan module 20; when the operational temperature of the processor 10 drops, the duty cycle of the fan control signal $S_{FG}$ is decreased accordingly for reducing the motor speed of the fan module 20.

Each of the left-channel speaker SPK_L and the right-channel speaker SPK_R in the stereo micro speaker module 40 is an electronic component capable of converting electronic signals into audio signals and normally includes diaphragms and a control circuit made of electromagnets and coils. The stereo micro speaker module 40 is configured to adjust its orientation according to the beam-forming control signal $S_{BF}$ so that the sound directions of the left-channel speaker SPK_L and the right-channel speaker SPK_R are both towards a specific location. Meanwhile, the stereo micro speaker module 40 is configured to provide the noise-cancellation signal y(n) according to the speaker control signal $S_{MIC}$ provided by the ANC controller 60. When the current of the speaker control signal $S_{MIC}$ flows through the coils in the stereo micro speaker module 40, the coils vibrate in the same frequency of the current. The diaphragms attached to the coils also start to vibrate, thereby causing disturbance in surrounding air for producing sound. Since the stereo micro speaker module 40 is used to provide sound effect when a user operates the electronic system 100, it may be disposed on the front-side of the electronic system 100 facing the user.

The reference microphone 50 may be disposed near the fan blades of the fan module 20 for measuring noises generated by the fan module 20 during operation and for transmitting the corresponding wide-band noise signal f(n) to the ANC controller 60, wherein the wide-band noise signal f(n) includes the wide-band noise spectrum of the turbulence noises generated by the fan module 20 during operation. In an embodiment, the reference microphone 50 may be a micro electro mechanical system (MEMS) microphone characterized in high heat tolerance, high anti-vibration and high RF immunity. However, the type of the reference microphone 50 does not limit the scope of the present invention.

Figure 3:
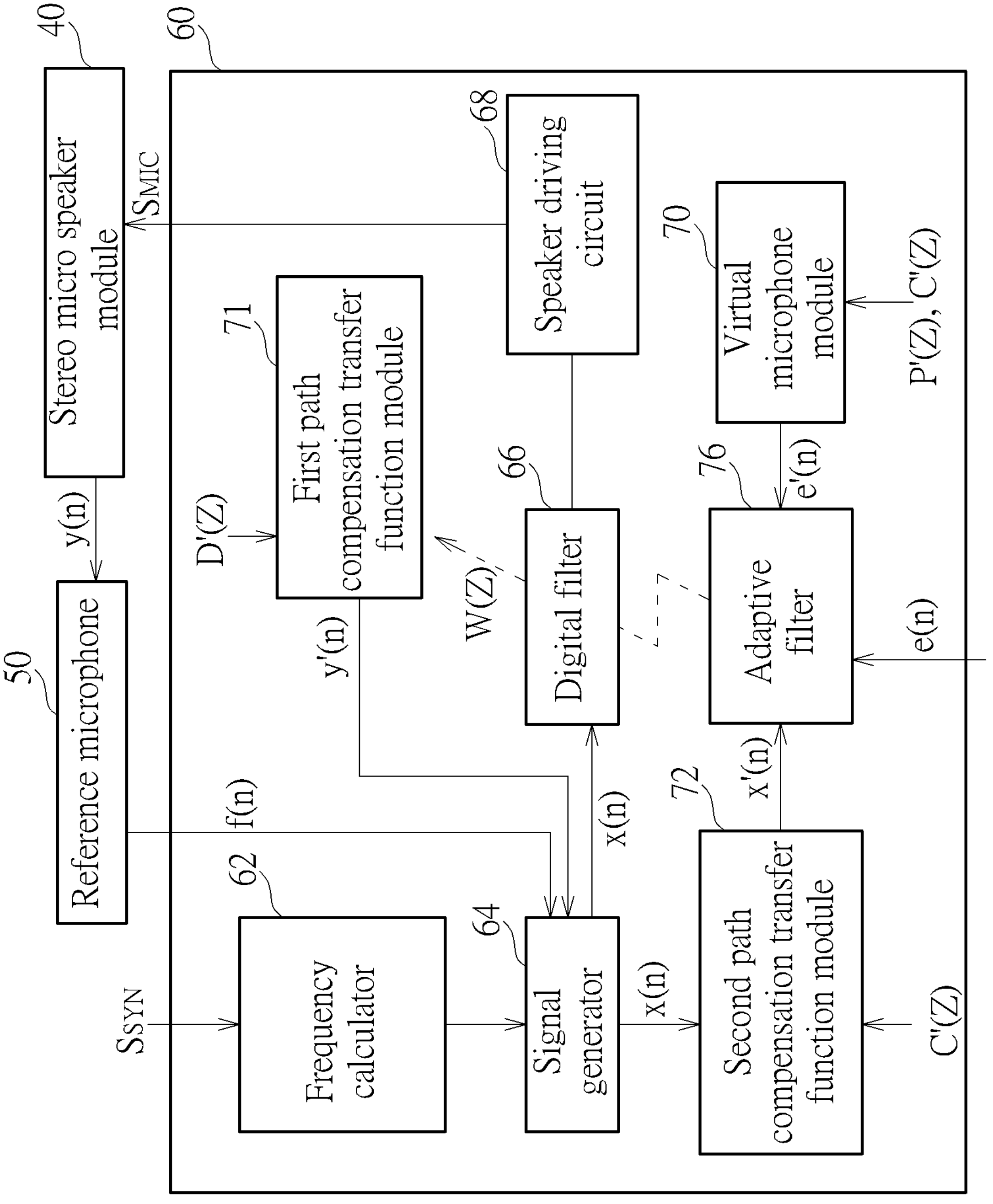
FIG. 3 is a diagram illustrating an implementation of an active noise cancellation controller in an electronic system according to an embodiment of the present invention.

FIG. 3 is a diagram illustrating an implementation of the ANC controller 60 in the electronic system. 100 according to an embodiment of the present invention. The ANC controller 60 includes a frequency calculator 62, a signal generator 64, a digital filter 66, a speaker driving circuit 68, a first path compensation transfer function module 71, a second path compensation transfer function module 72, an adaptive filter 76, and the virtual microphone module 70.

When the electronic system 100 operates in the off-line mode, the ANC controller 60 is configured to receive the synchronization signal $S_{SYN}$, receive the wide-band noise signal f(n) associated with the noise-cancellation signal y(n) from the reference microphone 50, and receive the error signal e(n) from the physical error microphone 80 so as to acquire the transfer function C'(Z) between the stereo micro speaker module 40 and the physical error microphone 80, the transfer function D'(Z) between the stereo micro speaker module 40 and the reference microphone 50, and the transfer function P'(Z) between the reference microphone 50 and the physical error microphone 80. The synchronization signal $S_{SYN}$ includes the information associated with the structure of the fan module 20 (such as the number of blades in each fan) and the operational setting (such as the motor speed in different operational modes). In the embodiments depicted in FIGS. 1 and 2, the synchronization signal $S_{SYN}$ may be provided by the embedded controller 30. In another embodiment of the present invention, the synchronization signal $S_{SYN}$ may be provided by the processor 10 or another device.

When the electronic system 100 operates in the on-line mode, the ANC controller 60 is configured to receive the synchronization signal $S_{SYN}$ and receive the wide-band noise signal f(n) associated with the noise-cancellation signal y(n) from the reference microphone 50, Meanwhile the virtual microphone module 70 is configured to provide the virtual error signal e'(n) based on the transfer functions C'(Z) and P'(Z) acquired in the off-line mode. Based on the synchronization signal $S_{SYN}$, the wide-band noise signal f(n), the virtual error signal e'(n) and the transfer functions C'(Z) and D'(Z), the ANC controller 60 may calculate the actual wide-band noises among the noises generated by the fan module 20 when operating at a predetermined fan speed, thereby providing the speaker control signal $S_{MIC}$ accordingly for driving the stereo micro speaker module 40. This way, the noise signal d(n) may be effectively canceled by the noise-cancellation signal y(n) provided by the stereo micro speaker module 40, with the expectation to keep the virtual error signal e'(n) at zero. In the embodiments depicted in FIGS. 1 and 2, the synchronization signal $S_{SYN}$ may be provided by the embedded controller 30. In another embodiment of the present invention, the synchronization signal $S_{SYN}$ may be provided by the processor 10 or another device.

Figure 4:
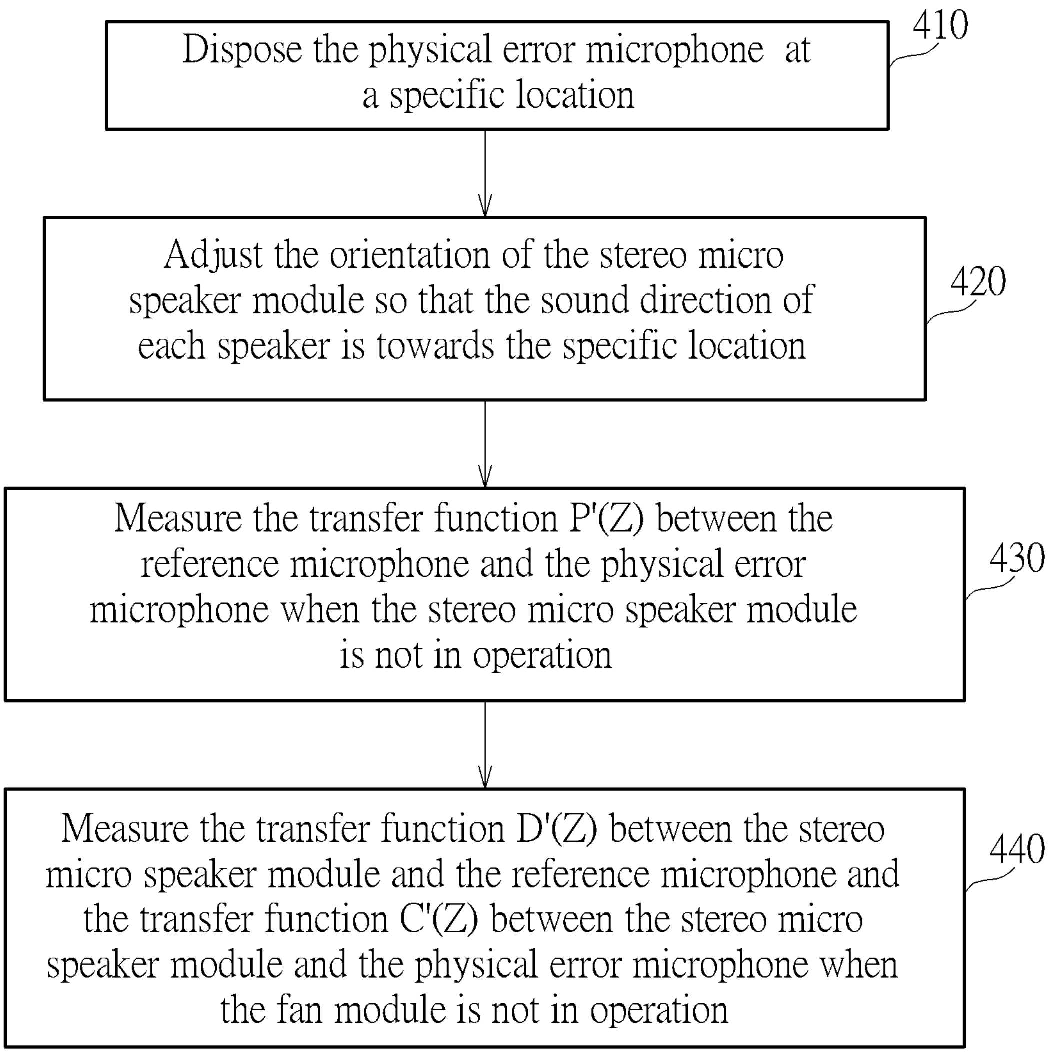
FIG. 4 is a flowchart illustrating the operation of an electronic system having heat dissipation and feed-forward active noise control function in the off-line mode according to an embodiment of the present invention.

FIG. 4 is a flowchart illustrating the operation of the electronic system 100 having heat dissipation and feed-forward active noise control function in the off-line mode according to an embodiment of the present invention. The flowchart in FIG. 4 includes the following steps:

Step 410: dispose the physical error microphone 80 at a specific location.

Step 420: adjust the orientation of the stereo micro speaker module 40 so that the sound direction of each speaker is towards the specific location.

Step 430: measure the transfer function P'(Z) between the reference microphone 50 and the physical error microphone 80 when the stereo micro speaker module 40 is not in operation.

Step 440: measure the transfer function D'(Z) between the stereo micro speaker module 40 and the reference microphone 50 and the transfer function C'(Z) between the stereo micro speaker module 40 and the physical error microphone 80 when the fan module 20 is not in operation.

Figure 5:
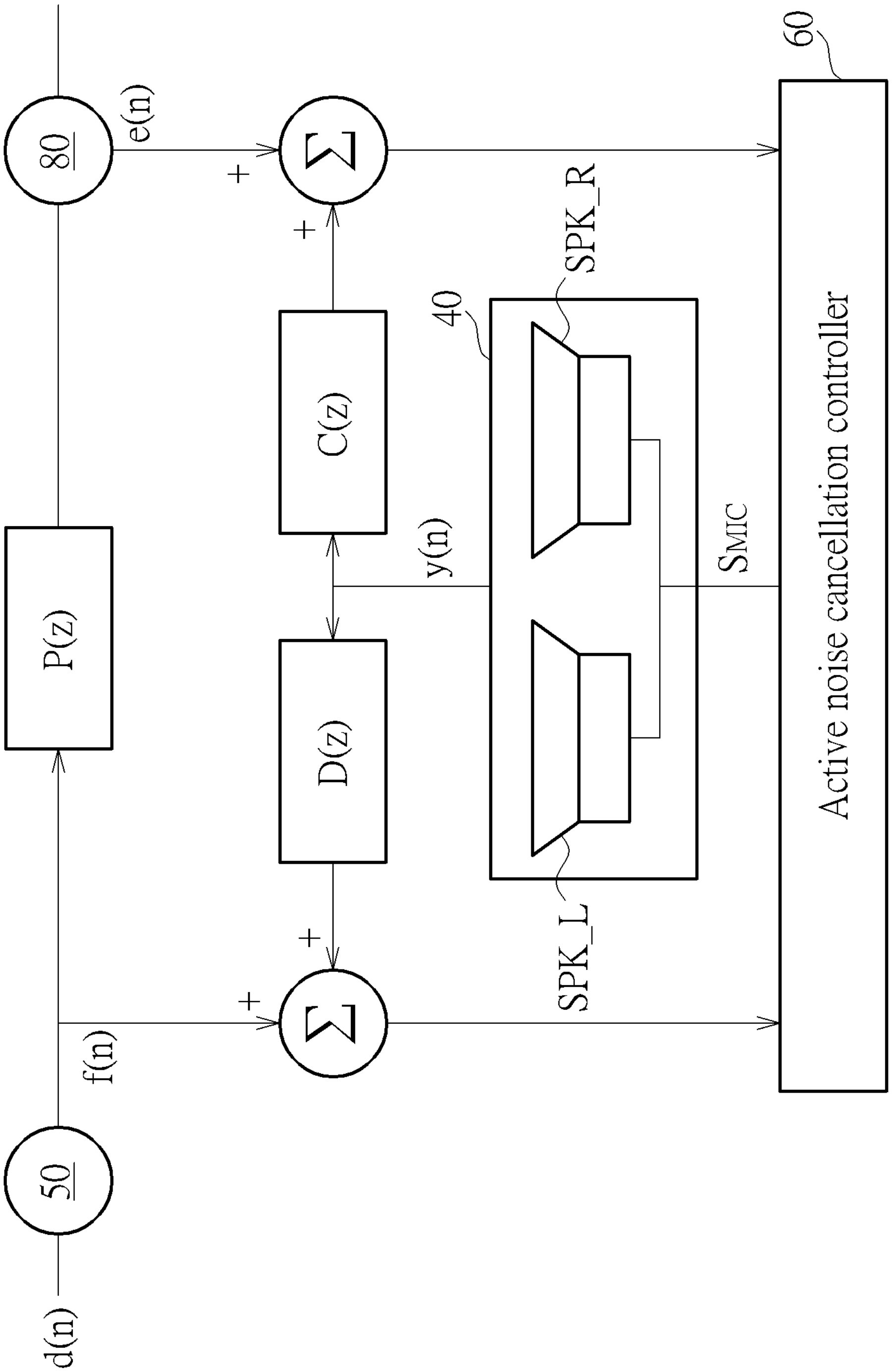
FIG. 5 is a diagram illustrating the transfer functions between a stereo micro speaker module, a reference microphone and a physical error microphone during signal transmission when an electronic system having heat dissipation and feed-forward active noise control function operates in the off-line mode according to an embodiment of the present invention.

FIG. 5 is a diagram illustrating the transfer functions between the stereo micro speaker module 40, the reference microphone 50 and the physical error microphone 80 during signal transmission when the electronic system 100 having heat dissipation and feed-forward active noise control function operates in the off-line mode according to an embodiment of the present invention. In FIG. 5, d(n) represents the noise signal generated during the operation of the electronic system 100 in the off-line mode, f(n) represents the wide-band noise signal measured by the reference microphone 50, e(n) represents the error signal outputted by the physical error microphone 80, y(n) represents the noise-cancellation signal provided by the stereo micro speaker module 40, $S_{MIC}$ represents the speaker control signal outputted by the ANC controller 60, P(Z) represents the transfer function between the reference microphone 50 and the physical error microphone 80, D(Z) represents the transfer function between the stereo micro speaker module 40 and the reference microphone 50, and C(Z) represents the transfer function between the stereo micro speaker module 40 and the physical error microphone 80. Since the fan module 20 generates different wind pressure when operating at different fan speeds, the transfer functions between the stereo micro speaker module 40, the reference microphone 50 and the physical error microphone 80 also vary accordingly. Therefore, the transfer functions associated with each fan speed may be acquired in the off-line mode.

In step 410, the physical error microphone 80 is disposed at the specific location which may be an estimated location of the user who operates the electronic system 100. For example, when the electronic system 100 is a laptop computer, the head of the user is normally located in front of the screen with a certain distance apart. Therefore, the physical error microphone 80 may be disposed at the estimated location of the user's head, such as 30-45 cm in front of the screen of the electronic system 100, but not limited thereto. The physical error microphone 80 is configured to capture the overall noises of the electronic system 100 in the off-line mode and output the corresponding error signal e(n) to the ANC controller 60. More specifically, the error signal e(n) outputted by the physical error microphone 80 is the difference between the noise signal d(n) and the noise-cancellation signal y(n), and a smaller value of the error signal e(n) indicates better noise cancellation.

In step 420, the beam-forming control module 90 is configured to provide the beam-forming signal $S_{BF}$ according to the location signal S1 so that the sound direction of each speaker may be directed towards the specific location. The location signal S1 is associated with the estimated location of the user, and may be provided by the processor 10, the embedded controller 30 or another device, but not limited thereto.

In step 430, the adaptive filter 73 is configured to measure the transfer function P'(Z) between the reference microphone 50 and the physical error microphone 80 when the stereo micro speaker module 40 is not in operation. More specifically, in step 430, the ANC controller 60 is configured to output the microphone control signal $S_{MIC}$ for deactivating the stereo micro speaker module 40 (y(n)=0). Under such circumstance, the adaptive filter 76 is configured to adjust the parameter W(Z) of the digital filter 66 according to the wide-band noise signal f(n) measured by the reference microphone 50 and the error signal e(n) outputted by the physical error microphone 80. After performing the above-mentioned adaptive signal processing for a predetermined period of time, the parameter W(Z) of the digital filter 66 converges to a predetermined stable status, and the current parameter W(Z) of the digital filter 66 in the predetermined stable status may be used as the transfer function P'(Z) between the reference microphone 50 and the physical error microphone 80.

In step 440, the transfer function D'(Z) between the stereo micro speaker module 40 and the reference microphone 50 and the transfer function C'(Z) between the stereo micro speaker module 40 and the physical error microphone 80 are measured in a windless environment. More specifically, in step 440, the embedded controller 30 is configured to output the fan control signal $S_{FG}$ for deactivating the fan module 20, and the ANC controller 60 is configured to output the microphone control signal $S_{MIC}$ for controlling the stereo micro speaker module 40 to provide the noise-cancellation signal y(n). In the off-line mode, the noise-cancellation signal y(n) is used as white noise for test purpose, and the ANC controller 60 is configured to adjust the parameter W(Z) of the digital filter 66 according to the noise-cancellation signal y(n) provided by the stereo micro speaker module 40 and the error signal e(n) outputted by the physical error microphone 80. After performing the above-mentioned adaptive signal processing for a predetermined period of time, the parameter W(Z) of the digital filter 66 converges to a predetermined stable status, and the current parameter W(Z) of the digital filter 66 in the predetermined stable status may be used as the transfer function D'(Z) between the stereo micro speaker module 40 and the reference microphone 50 in the windless environment. Similarly, the adaptive filter 76 is configured to adjust the parameter W(Z) of the digital filter 66 according to the noise-cancellation signal y(n) provided by the stereo micro speaker module 40 and the error signal e(n) outputted by the physical error microphone 80. After performing the above-mentioned adaptive signal processing for a predetermined period of time, the parameter W(Z) of the digital filter 66 converges to a predetermined stable status, and the current parameter W(Z) of the digital filter 66 in the predetermined stable status may be used as the transfer function C'(Z) between the stereo micro speaker module 40 and the physical error microphone 80 in the windless environment.

Figure 6:
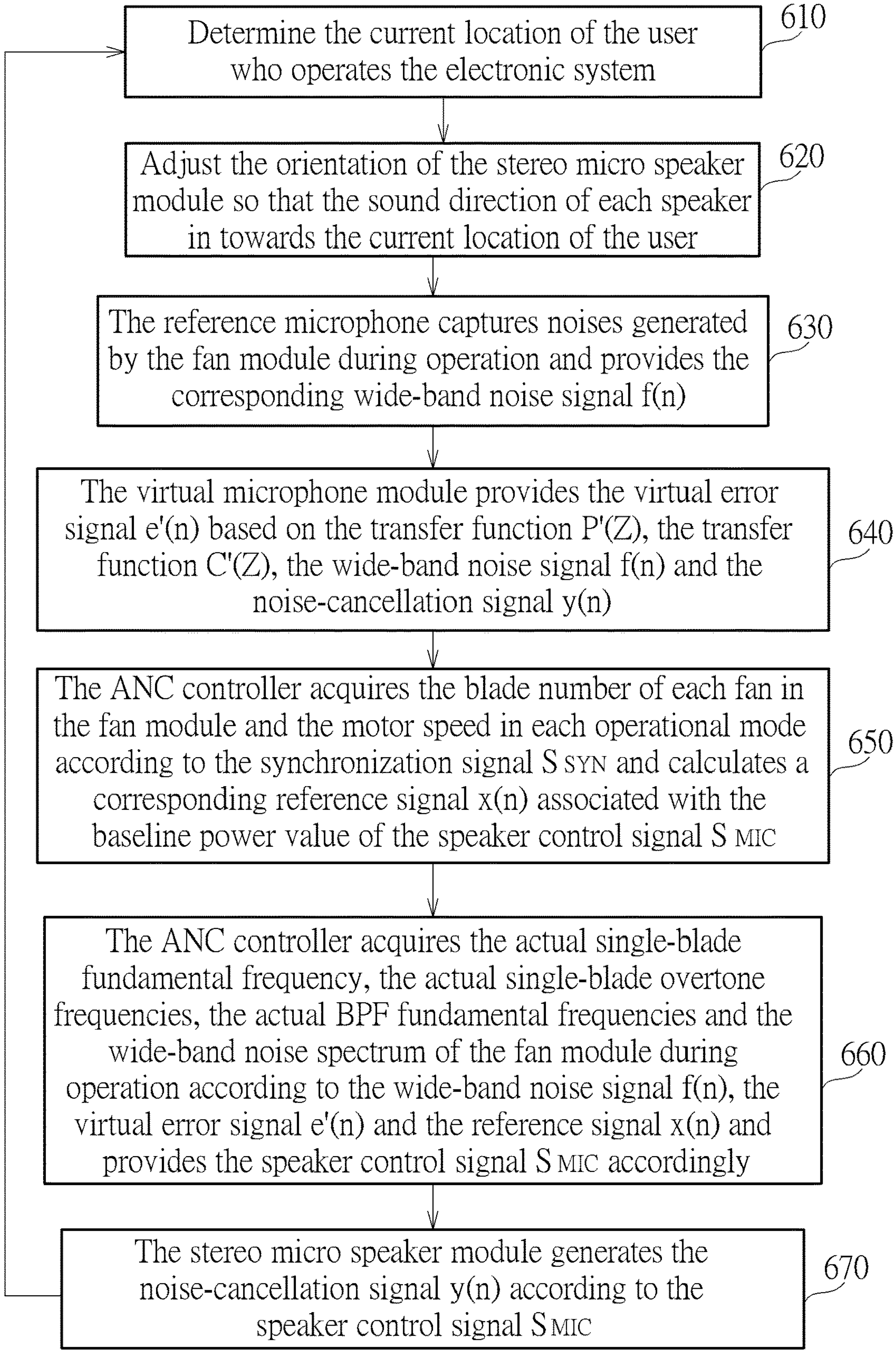
FIG. 6 is a flowchart illustrating the operation of an electronic system having heat dissipation and feed-forward active noise control function in the on-line mode according to an embodiment of the present invention.

FIG. 6 is a flowchart illustrating the operation of the electronic system 100 having heat dissipation and feed-forward active noise control function in the on-line mode according to an embodiment of the present invention. The flowchart in FIG. 6 includes the following steps:

Step 610: determine the current location of the user who operates the electronic system 100.

Step 620: adjust the orientation of the stereo micro speaker module 40 so that the sound direction of each speaker in towards the current location of the user Step 630: the reference microphone 50 captures noises generated by the fan module 20 during operation and provides the corresponding wide-band noise signal f(n).

Step 640: the virtual microphone module 70 provides the virtual error signal e'(n) based on the transfer function P'(Z), the transfer function C'(Z), the wide-band noise signal f(n) and the noise-cancellation signal y(n).

Step 650: the ANC controller 60 acquires the blade number of each fan in the fan module 20 and the motor speed in each operational mode according to the synchronization signal $S_{SYN}$ and calculates a corresponding reference signal x(n) associated with the baseline power value of the speaker control signal $S_{MIC}$.

Step 660: the ANC controller 60 acquires the actual single-blade fundamental frequency, the actual single-blade overtone frequencies, the actual blade passing frequency (BPF) fundamental frequencies and the wide-band noise spectrum of the fan module 20 during operation according to the wide-band noise signal f(n), the virtual error signal e'(n) and the reference signal x(n) and provides the speaker control signal $S_{MIC}$ accordingly.

Step 670: the stereo micro speaker module 40 generates the noise-cancellation signal y(n) according to the speaker control signal $S_{MIC}$; execute step 610.

In step 610, the current location of the user when operating the electronic system 100 is determined. In an embodiment, the current location of the user may be defined by the electronic system 100. For example, the current location of the user may be located in front of the screen of the electronic system 100 with a predetermined distance apart, wherein the value of the predetermined distance may vary according to the type of the electronic system 100. In another embodiment, the electronic system 100 may further include an image identification unit for detecting the actual location of the user on a real-time basis.

In step 620, the beam-forming control module 90 is configured to provide the beam-forming signal $S_{BF}$ according to the location signal S2 so that the sound direction of each speaker may be directed towards the current location of the user. In an embodiment, the location signal S2 is associated with the estimated location of the user defined by the electronic system 100, and may be provided by the processor 10, the embedded controller 30, or another device. In another embodiment, the location signal S2 is associated with the actual location of the user when operating the electronic system. 100, and may be provided by the image identification unit in the electronic system 100.

The noise source during the operation of the fan module 20 originates from the air flow caused by the rotation of the motor. The narrow-band component of the noises may be thickness noises or BPF noises. Thickness noises are the result of the sound wave pulse created by the repetitive rotary motion of the air being displaced by the blade surface. BPF noises are caused by structural vibration (axial force and surface force) of the fan module 20. Since BPF and related harmonic waves are associated with the turbulent flow fluctuations as each fan blade passes a specific reference point, the periodic pressure wave at the tip of each fan blade generates a specific narrow-band noise. Also, acoustic waves are generated when the instabilities in the laminar boundary layer on the suction side of the fan blade interact with the trailing edge of the blade. These acoustic waves radiate from the trailing edge and form a feedback loop with the source of the instabilities, resulting in vortex shedding which generates wide-band noises.

In step 630, the reference microphone 50 is configured to capture noises generated by the fan module 20 when the electronic system 100 operates in the on-line mode and provide the corresponding wide-band noise signal f(n).

In step 640, the virtual microphone module 70 is configured to provide the virtual error signal e'(n) based on the transfer function P'(Z), the transfer function C'(Z), the wide-band noise signal f(n) and the noise-cancellation signal y(n), wherein $e'(n)=P'(Z)*f(n)+C'(Z)*y(n)$. As previously stated, P'(Z) is the transfer function between the reference microphone 50 and the physical error microphone 80 at a specific fan speed, C'(Z) is the transfer function between the stereo micro speaker module 40 and the physical error microphone 80 in the windless environment, and D'(Z) is the transfer function between the stereo micro speaker module 40 and the reference microphone 50 in the windless environment. In the present invention, the virtual microphone module 70 may be implemented by software or firmware, but is not limited thereto.

In step 650, the frequency calculator 62 of the ANC controller 60 is configured to acquire the motor speed, the single-blade frequencies and the blade number of the fan module 20 according to the synchronization signal $S_{SYN}$, wherein the value of BPF is the multiple of the motor speed and the blade number of the fan module 20. Assuming that each fan in the fan module 20 has 37 blades, the following Table 1 illustrates the data calculated by the frequency calculator 62, but does not limit the scope of present invention. The motor speed is shown in rpm, and the frequency is shown in Hertz.

TABLE 1

| Motor speed | Fundamental frequency | $1^{st}$ | $2^{nd}$ overtone | $3^{th}$ | Blade number | BPF | BPF × 2 | BPF × 3 |
|---|---|---|---|---|---|---|---|---|
| 500 | 8.3 | 16.6 | 24.9 | 33.2 | 37 | 307.1 | 614.2 | 921.3 |
| 1000 | 16.6 | 33.2 | 49.8 | 66.4 | 37 | 614.2 | 1228.4 | 1842.6 |
| 1500 | 25 | 50 | 75 | 100 | 37 | 925 | 1850 | 2775 |
| 2000 | 33.3 | 66.6 | 99.9 | 133.2 | 37 | 1232.1 | 2464.2 | 3696.3 |
| 2500 | 41.7 | 83.4 | 125.1 | 166.8 | 37 | 1542.9 | 3085.8 | 4628.7 |
| 3000 | 50 | 100 | 150 | 200 | 37 | 1850 | 3700 | 5550 |
| 3500 | 58.3 | 116.6 | 174.9 | 233.2 | 37 | 2157.1 | 4314.2 | 6471.3 |
| 4000 | 66.7 | 133.4 | 200.1 | 266.8 | 37 | 2467.9 | 4935.8 | 7403.7 |
| 4500 | 75 | 150 | 225 | 300 | 37 | 2775 | 5550 | 8325 |
| 5000 | 83.3 | 166.6 | 249.9 | 333.2 | 37 | 3082.1 | 6164.2 | 9246.3 |
| 5500 | 91.6 | 183.2 | 274.8 | 366.4 | 37 | 3389.2 | 6778.4 | 10167.6 |
| 5700 | 95 | 190 | 285 | 380 | 37 | 3515 | 7030 | 10545 |

Next, the signal generator 64 in the ANC controller 60 is configured to generate the reference signal x(n) according to the data calculated by the frequency calculator 62, wherein the reference signal x(n) includes the information associated with the estimated overtones, the estimated BPF, and the sound pressure (dBSPL) at different fan speeds for determining the baseline power value of the speaker control signal $S_{MIC}$. The power value of the speaker control signal $S_{MIC}$ may be adjusted by varying the parameter W(Z) of the digital filter 66.

In step 660, the ANC controller 60 is configured to acquire the actual single-blade fundamental frequency, the actual single-blade overtone frequencies, the actual BPF fundamental frequencies and the wide-band noise spectrum of the fan module 20 during operation according to the wide-band noise signal f(n), the virtual error signal e'(n) and the reference signal x(n), thereby providing the speaker control signal $S_{MIC}$ accordingly for controlling the stereo micro speaker module 40 to provide the noise-cancellation signal y(n). More specifically, the noise-cancellation signal y(n) includes a plurality of noise-compensation signals which are reverse signals respectively associated with the actual single-blade fundamental frequency, the actual single-blade overtone frequency, the actual BPF fundamental frequency, the actual BPF overtone frequency and the wide-band noise spectrum.

In step 670, the ANC controller 60 is configured to adjust the characteristics of the speaker control signal $S_{MIC}$ according to the transfer function D'(Z) between the stereo micro speaker module 40 and the reference microphone 50 and the transfer function C'(Z) between the stereo micro speaker module 40 and the physical error microphone 80. More specifically, the first path compensation transfer function module 71 is configured to process the noise-cancellation signal y(n) according to the transfer function D'(Z) between the stereo micro speaker module 40 and the reference microphone 50 which is associated with the current fan speed and acquired in the off-line mode and output the processed noise-cancellation signal y'(n) to the signal generator 64. The signal generator 64 is configured to acquire the reference x(n) by subtracting the processed noise-cancellation signal y'(n) from the wide-band noise signal f(n) and output the reference x(n) to the digital filter 66 and the second path compensation transfer function module 72. Next, the second path compensation transfer function module 72 is configured to calibrate the reference signal x(n) according to the transfer function C'(Z) between the stereo micro speaker module 40 and the physical error microphone 80 which is associated with the current fan speed and acquired in the off-line mode and output the calibrated reference signal x'(n) to the adaptive filter 76.

The adaptive filter 76 is configured to process the calibrated reference signal x'(n) and the virtual error signal e'(n) based on a specific algorithm, thereby adjusting the parameter W(Z) of the digital filter 66. More specifically, the calibrated reference signal x'(n) includes the information associated with motor speed, the estimated single-blade fundamental frequency, the estimated BPF and the estimated wind pressure of the fan module 20. The adaptive filter 76 is configured acquire the information related to narrow-band noises (such as the actual single-blade fundamental frequency, the actual overtones and the actual BPF of the fan module 20) according to the error signal e(n) for adjusting the parameter W(Z) of the digital filter 66. This way, when the digital filter 66 drives the speaker driving circuit 68 for outputting the speaker control signal $S_{MIC}$, the noise-cancellation signal y(n) can reflect the actual operational status of the fan module 20, the wind pressure at the current fan speed, and the current noise cancellation level. More specifically, the noise-cancellation signal y(n) includes a plurality of noise-compensation signals which are reverse signals respectively associated with the actual single-blade fundamental frequency, the actual single-blade overtone frequency, the actual BPF fundamental frequency, the actual BPF overtone frequency, the wide-band noise spectrum and the actual wind pressure. After signal transmission, the noise-cancellation signal y(n) provided by the stereo micro speaker module 40 may effectively cancel the noise signal d(n), with the expectation to keep the virtual error signal e'(n) at zero.

In an embodiment, the adaptive filter 76 may process the calibrated reference signal x'(n) and the virtual error signal e'(n) based on least mean square (LMS) algorithm. However, the algorithm adopted by the adaptive filter 76 does not limit the scope of the present invention.

In conclusion, in the electronic system 100 with heat dissipation and feed-forward active noise control function of the present invention, the beam-forming control module 90 is configured to adjust the orientation of the stereo micro speaker module 40 in the off-line mode so that the sound direction of each speaker may be directed towards a first specific location (such as the estimated location of the user when operating the electronic system 100). Under such circumstance, the transfer function P'(Z) between the reference microphone 50 and the physical error microphone 80, the transfer function D(Z) between the stereo micro speaker module 40 and the reference microphone 50 and the transfer function C(Z) between the stereo micro speaker module 40 and the physical error microphone 80 at each fan speed may be acquired in the off-line mode. Next in the on-line mode, the beam-forming control module 90 is configured to adjust the orientation of the stereo micro speaker module so that the sound direction of each speaker may be directed towards a second specific location (such as the estimated location or the actual location of the user when operating the electronic system 100). Under such circumstance, the reference microphone 50 is configured to measure noises generated by the fan module 20 during operation and provide the corresponding wide-band noise signal f(n), and the virtual microphone module 70 is configured to capture noises during the operation of the electronic system 100 and provide the corresponding virtual error signal e'(n) according to the transfer function P'(Z) between the reference microphone 50 and the physical error microphone 80 at a specific fan speed, the transfer function C'(Z) between the stereo micro speaker module 40 and the physical error microphone 80 in the windless environment, the wide-band noise signal f(n) and the noise-cancellation signal y(n). According to the synchronization signal $S_{SYN}$, the wide-band noise signal f(n), the virtual error signal e'(n), and the transfer functions C'(Z) and D'(Z) acquired in the off-line mode, the ANC controller 60 is configured to acquire the information related to the wide-band noises among the noises generated by the fan module 20 when operating at a predetermined fan speed, thereby providing the speaker control signal $S_{MIC}$ accordingly for driving the stereo micro speaker module 40. This way, the noise signal d(n) may be effectively canceled by the noise-cancellation signal y(n) provided by the stereo micro speaker module 40. The virtual microphone module 70 can simulate the operation of the physical error microphone 80 by operating based on the transfer functions P'(Z) and C'(Z). Since the beam-forming control module 70 can adjust the orientation of the stereo micro speaker module 40 on a real-time basis so that the noise-cancellation signal y(n) may be directed towards the location of the user who operates the electronic system 100. Therefore, the present electronic system 100 does not need to include a physical error microphone or an extra speaker module disposed along the fan path for providing feed-forward active noise control function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system with heat dissipation and feed-forward active noise control function, comprising:
- a fan module configured to operate according to a fan control signal for providing heat dissipation;
- an embedded controller configured to provide the fan control signal;
- a reference microphone configured to detect a wide-band noise generated during an operation of the electronic system and provide a corresponding wide-band noise signal;
- a stereo micro speaker module comprising at least a first speaker and a second speaker, and configured to generate a noise-cancellation signal according to the speaker control signal;
- a beam-forming control module configured to provide a beam-forming control signal for controlling an orientation of the stereo micro speaker module so that a sound direction of the first speaker and a sound direction of the second speaker are towards a specific location; and
- an active noise cancellation controller configured to:
  - provide a virtual error signal according to a first transfer function, a second transfer function and the wide-band noise signal; and
  - provide the speaker control signal according to a synchronization signal, the wide-band noise signal and the virtual error signal, wherein:
    - the synchronization signal includes information associated with a structure and an operational setting of the fan module;
    - the first transfer function is a transfer function between the reference microphone and a physical error microphone when the stereo micro speaker is not in operation;
    - the second transfer function is a transfer function between the stereo micro speaker module and the physical error microphone when the fan module is not in operation; and
    - the noise-cancellation signal includes a plurality of noise-compensation signals for canceling noises generated during the operation of the electronic system.

2. The electronic system of claim 1, further comprising:
- an image identification unit configured to detect an actual location of a user who operates the electronic system, wherein the beam-forming control module is further configured to provide the beam-forming control signal based on the actual location of the user.

3. The electronic system of claim 1, wherein:
- the active noise cancellation controller is further configured to:

measure the first transfer function between the reference microphone and the physical error microphone when the stereo micro speaker module is not in operation;

measure the second transfer function between the stereo micro speaker module and the physical error microphone when the fan module is not in operation;

measure a third transfer function between the stereo micro speaker module and the reference microphone when the fan module is not in operation; and acquire the virtual error signal based on the first transfer function and the second transfer function, wherein a value of the virtual error signal is equal to a sum of a multiple of the first transfer function and the wide-band noise signal and a multiple of the second transfer function and the noise-cancellation signal; and the specific location is an estimated location of the user when operating the electronic system during a period when the first transfer function, the second transfer function, and the third transfer function are measured.

4. The electronic system of claim 3, wherein the active noise cancellation controller comprises:

a virtual microphone module configured to provide the virtual error signal according to the first transfer function and the second transfer function;

a frequency calculator configured to acquire an estimated single-blade fundamental frequency, an estimated single-blade overtone frequency, and an estimated blade passing frequency (BPF) fundamental frequency of the fan module according to the synchronization signal;

a signal generator configured to generate a reference signal according to the estimated single-blade fundamental frequency, the estimated single-blade overtone frequency, and the estimated BPF fundamental frequency; and a digital filter configured to process the reference signal for determining a baseline power value of the speaker control signal.

5. The electronic system of claim 4, wherein the active noise cancellation controller further comprises:

an adaptive filter configured to adjust a parameter of the digital filter based on the second transfer function, the third transfer function and the virtual error signal for adaptively adjusting a power value of the speaker control signal.

6. The electronic system of claim 5, wherein the adaptive filter is further configured to process the reference signal, the wide-band noise signal and the virtual error signal based on a least mean square (LMS) algorithm.

7. The electronic system of claim 5, wherein the active noise cancellation controller further comprises:

a first path compensation transfer function module coupled to the stereo micro speaker module for receiving the noise-cancellation signal, processing the noise-cancellation signal according to the third transfer function and outputting the processed noise-cancellation noise signal to the signal generator; and a second path compensation transfer function module coupled to the signal generator for receiving the reference signal, processing the reference signal according to the second transfer function and outputting the processed reference signal to the adaptive filter.

8. The electronic system of claim 7, wherein the signal generator is further configured to provide the reference signal by subtracting the processed noise-cancellation signal from the wide-band noise signal.

9. The electronic system of claim 1, wherein the active noise cancellation controller is further configured to:

acquire an actual single-blade fundamental frequency, an actual single-blade overtone frequency, an actual BPF fundamental frequency, an actual BPF overtone frequency and an actual wide-band noise spectrum of the fan module according to the synchronization signal, the wide-band noise signal and the virtual error signal when the fan module operates at a predetermined fan speed; and provide the speaker control signal according to the actual single-blade fundamental frequency, the actual single-blade overtone frequency, the actual BPF fundamental frequency, the actual BPF overtone frequency and the actual wide-band noise spectrum of the fan module.

10. The electronic system of claim 9, wherein the plurality of noise-compensation signals are reverse signals respectively associated with the actual single-blade fundamental frequency, the actual single-blade overtone frequency, the actual BPF fundamental frequency, the actual BPF overtone frequency and the actual wide-band noise spectrum.

11. A method of providing heat dissipation and feed-forward active noise control function in an electronic system, comprising:

operating a fan module in the electronic system according to a fan control signal for providing heat dissipation;

providing the fan control signal using an embedded controller in the electronic system;

detecting a wide-band noise generated during an operation of the electronic system and providing a corresponding wide-band noise signal using a reference microphone in the electronic system;

generating a noise-cancellation signal according to the speaker control signal using at least a first speaker and a second speaker of a stereo micro speaker module in the electronic system;

providing a beam-forming control signal for controlling an orientation of the stereo micro speaker module using a beam-forming control module in the electronic system so that a sound direction of the first speaker and a sound direction of the second speaker are towards a specific location;

providing a virtual error signal according to a first transfer function, a second transfer function and the wide-band noise signal using an active noise cancellation controller in the electronic system; and providing the speaker control signal according to a synchronization signal, the wide-band noise signal and the virtual error signal using the active noise cancellation controller, wherein:

the synchronization signal includes information associated with a structure and an operational setting of the fan module;

the first transfer function is a transfer function between the reference microphone and a physical error microphone when the stereo speaker is not in operation;

the second transfer function is a transfer function between the stereo micro speaker module and the physical error microphone when the fan module is not in operation; and the noise-cancellation signal includes a plurality of noise-compensation signals for canceling noises generated during the operation of the electronic system.

12. The method of claim 11, further comprising:

detecting an actual location of a user who operates the electronic system using an image identification unit in the electronic system; and providing the beam-forming control signal based on the actual location of the user using the beam-forming control module.

13. The method of claim 11, further comprising:

measuring the first transfer function between the reference microphone and the physical error microphone when the stereo micro speaker module is not in operation using the active noise cancellation controller;

measuring the second transfer function between the stereo micro speaker module and the physical error microphone when the fan module is not in operation using the active noise cancellation controller;

measuring a third transfer function between the stereo micro speaker module and the reference microphone when the fan module is not in operation using the active noise cancellation controller; and acquiring the virtual error signal based on the first transfer function and the second transfer function, wherein:

a value of the virtual error signal is equal to a sum of a multiple of the first transfer function and the wide-band noise signal and a multiple of the second transfer function and the noise-cancellation signal; and the specific location is an estimated location of the user when operating the electronic system during a period when the first transfer function, the second transfer function, and the third transfer function are measured.

14. The method of claim 11, further comprising:

providing the virtual error signal according to the first transfer function and the second transfer function using a virtual microphone module in the active noise cancellation controller;

acquiring an estimated single-blade fundamental frequency, an estimated single-blade overtone frequency, and an estimated blade passing frequency (BPF) fundamental frequency of the fan module according to the synchronization signal using a frequency calculator in the active noise cancellation controller;

generating a reference signal according to the estimated single-blade fundamental frequency, the estimated single-blade overtone frequency, and the estimated BPF fundamental frequency using a signal generator in the active noise cancellation controller; and processing the reference signal for determining a baseline power value of the speaker control signal using a digital filter in the active noise cancellation controller.

15. The method of claim 14, further comprising:

adjusting a parameter of the digital filter based on the second transfer function, the third transfer function and the virtual error signal for adaptively adjusting a power value of the speaker control signal using an adaptive filter in the ANC controller.

16. The method of claim 15, further comprising:

processing the reference signal, the wide-band noise signal and the virtual error signal using the adaptive filter based on a least mean square (LMS) algorithm.

17. The method of claim 15, further comprising:

receiving the noise-cancellation signal, processing the noise-cancellation signal according to the third transfer function and outputting the processed noise-cancellation noise signal to the signal generator using a first path compensation transfer function module in the electronic system; and receiving the reference signal, processing the reference signal according to the second transfer function and outputting the processed reference signal to the adaptive filter using a second path compensation transfer function in the electronic system.

18. The method of claim 17, further comprising:

providing the reference signal by subtracting the processed noise-cancellation signal from the wide-band noise signal using the signal generator.

19. The method of claim 11, further comprising:

acquiring an actual single-blade fundamental frequency, an actual single-blade overtone frequency, an actual BPF fundamental frequency, an actual BPF overtone frequency and an actual wide-band noise spectrum of the fan module according to the synchronization signal, the wide-band noise signal and the virtual error signal using the active noise cancellation controller when the fan module operates at the predetermined fan speed; and providing the speaker control signal according to the actual single-blade fundamental frequency, the actual single-blade overtone frequency, the actual BPF fundamental frequency, the actual BPF overtone frequency and the actual wide-band noise spectrum of the fan module using the active noise cancellation controller.

20. The method of claim 19, wherein the plurality of noise-compensation signals are reverse signals respectively associated with the actual single-blade fundamental frequency, the actual single-blade overtone frequency, the actual BPF fundamental frequency, the actual BPF overtone frequency and the actual wide-band noise spectrum.

* * * * *